United States Patent
Osterhouse (10) Patent No.: US 11,904,494 B2
(45) Date of Patent: Feb. 20, 2024

(54) CYLINDER FOR A LIQUID JET PUMP WITH MULTI-FUNCTIONAL INTERFACING LONGITUDINAL ENDS

(71) Applicant: Hypertherm, Inc., Hanover, NH (US)

(72) Inventor: David Osterhouse, New Brighton, MN (US)

(73) Assignee: Hypertherm, Inc., Hanover, NH (US)

( * ) Notice: Subject to any disclaimer, the term of this patent is extended or adjusted under 35 U.S.C. 154(b) by 370 days.

(21) Appl. No.: 17/216,194

(22) Filed: Mar. 29, 2021

(65) Prior Publication Data

US 2021/0299904 A1    Sep. 30, 2021

Related U.S. Application Data

(60) Provisional application No. 63/002,155, filed on Mar. 30, 2020.

(51) Int. Cl.
| | |
|---|---|
| F16K 17/168 | (2006.01) |
| B26F 3/00 | (2006.01) |
| F16J 15/32 | (2016.01) |

(52) U.S. Cl.
CPC ............. B26F 3/004 (2013.01); F16J 15/32 (2013.01)

(58) Field of Classification Search
CPC ................................ B26F 3/004; F16J 15/32
USPC .......................................................... 83/177
See application file for complete search history.

(56) References Cited

U.S. PATENT DOCUMENTS

| | | |
|---|---|---|
| 1,081,071 A | 12/1913 | Westland |
| 1,144,556 A | 6/1915 | Lowe |
| 1,544,519 A | 6/1925 | McKinley et al. |
| 1,554,406 A | 9/1925 | Coberly |
| 1,684,431 A | 9/1928 | Behee, Jr. |

(Continued)

FOREIGN PATENT DOCUMENTS

| | | |
|---|---|---|
| CN | 101811287 A | 8/2010 |
| CN | 201650635 U | 11/2010 |

(Continued)

OTHER PUBLICATIONS

Genuine Flow Parts—87K High-pressure Cylinder, copyright 2021 Flow International Corporation, A Shape Technologies Company, https://flowparts.com/collections/high-pressure-components/products/cylinder-hp-cartridge-87k-2-0-intn [last accessed Mar. 29, 2021], 4 pages.

(Continued)

Primary Examiner — Omar Flores Sanchez
(74) Attorney, Agent, or Firm — Perkins Coie LLP (57) ABSTRACT

A high-pressure cylinder of a liquid jet cutting system can include a first end portion, a second end portion, and a central bore configured to receive a plunger. The first end portion can have a first tapered surface configured to form a seal with a mating surface of a check valve when the high-pressure cylinder is in a first orientation, and a first annular surface configured to bear against a mating surface of a pump when the high-pressure cylinder is in a second orientation rotated 180 degrees end-over-end from the first orientation. The second end portion can have a second annular tapered surface configured to form a seal with the mating surface of the check valve when the high-pressure cylinder is in the second orientation, and a second annular surface configured to bear against the mating surface of the pump when the high-pressure cylinder is in the first orientation.

25 Claims, 3 Drawing Sheets

(56) References Cited

U.S. PATENT DOCUMENTS

| | | |
|---|---|---|
| 1,847,147 A | 4/1930 | Thomas, Jr. |
| 1,937,408 A | 11/1933 | Johnson |
| 2,007,180 A | 7/1935 | Doran et al. |
| 2,009,932 A | 7/1935 | Klotzman |
| 2,220,002 A | 10/1940 | Rollman et al. |
| 2,308,347 A | 1/1943 | Asselin |
| 2,340,975 A | 2/1944 | Morgan |
| 2,343,890 A | 3/1944 | Dewald |
| 2,359,352 A | 10/1944 | Bucknam et al. |
| 2,376,287 A | 5/1945 | Sorrentino |
| 2,386,675 A | 10/1945 | Ford |
| 2,399,571 A | 4/1946 | Porter |
| 2,403,751 A | 7/1946 | Palmer |
| 2,456,041 A | 12/1948 | Barker |
| 2,463,552 A | 3/1949 | Newhall |
| 2,528,280 A | 10/1950 | Lyon |
| 2,544,414 A | 3/1951 | Bridgman et al. |
| 2,550,435 A | 4/1951 | Willke |
| 2,558,035 A | 6/1951 | Bridgman |
| 2,570,698 A | 10/1951 | Manseau |
| 2,715,958 A | 8/1955 | Lindstrom et al. |
| 2,728,373 A | 12/1955 | Zimpel |
| 2,788,994 A | 4/1957 | Van De Wateren |
| 2,819,835 A | 1/1958 | Newhall |
| 2,822,789 A | 2/1958 | Philips et al. |
| 2,833,220 A | 5/1958 | Robinson et al. |
| 2,929,120 A | 3/1960 | Brandt et al. |
| 2,951,369 A | 9/1960 | Newhall |
| 2,952,071 A | 9/1960 | Burt |
| 2,985,050 A | 5/1961 | Schwacha |
| 2,999,552 A | 9/1961 | Fox |
| 3,081,990 A | 3/1963 | Bromley |
| 3,086,749 A | 4/1963 | Frye |
| 3,088,854 A | 5/1963 | Spies, Jr. |
| 3,095,900 A | 7/1963 | Newhall |
| 3,106,169 A | 10/1963 | Prosser et al. |
| 3,114,326 A | 12/1963 | Yaindl |
| 3,137,978 A | 6/1964 | Incantalupo |
| 3,148,528 A | 9/1964 | Reynolds |
| 3,174,364 A | 3/1965 | Sims |
| 3,232,638 A | 2/1966 | Bernard |
| 3,267,718 A | 8/1966 | Grube |
| 3,270,464 A | 9/1966 | Bowling, Jr. et al. |
| 3,296,855 A | 1/1967 | Newhall |
| 3,303,859 A | 2/1967 | Ackermann et al. |
| 3,323,809 A | 6/1967 | Brookfield |
| 3,343,794 A | 9/1967 | Voitsekhovsky |
| 3,373,695 A | 3/1968 | Yohpe |
| 3,382,565 A | 5/1968 | Binkley |
| 3,424,357 A | 1/1969 | Curtze et al. |
| 3,427,988 A | 2/1969 | Redman et al. |
| 3,449,742 A | 6/1969 | Stapleton |
| 3,452,412 A | 7/1969 | Allman, Jr. et al. |
| 3,454,288 A | 7/1969 | Mancusi |
| 3,507,740 A | 4/1970 | Gaspari |
| 3,517,701 A | 6/1970 | Smith |
| 3,521,853 A | 7/1970 | Gillis, Jr. et al. |
| 3,530,273 A | 9/1970 | Bollinger et al. |
| 3,543,444 A | 12/1970 | Mehta |
| 3,564,971 A | 2/1971 | Wagner et al. |
| 3,574,917 A | 4/1971 | Miyazaki |
| 3,593,459 A | 7/1971 | Kulischenko |
| 3,614,265 A | 10/1971 | Ohrberg |
| 3,668,498 A | 6/1972 | Austin, Jr. |
| 3,668,916 A | 6/1972 | Ledebur |
| 3,692,214 A | 9/1972 | Liedberg et al. |
| 3,702,624 A | 11/1972 | Fries |
| 3,705,693 A | 12/1972 | Franz |
| 3,708,936 A | 1/1973 | Rogers |
| 3,711,633 A | 1/1973 | Ghirardi et al. |
| 3,718,017 A | 2/1973 | Blackburn |
| 3,746,256 A | 7/1973 | Hall et al. |
| 3,746,483 A | 7/1973 | Hindel et al. |
| 3,750,961 A | 8/1973 | Franz |
| 3,756,106 A | 9/1973 | Chadwick et al. |
| 3,765,661 A | 10/1973 | Omura |
| 3,769,753 A | 11/1973 | Fleischer |
| 3,785,707 A | 1/1974 | Mitsuoka |
| 3,789,741 A | 2/1974 | Hallberg |
| 3,834,082 A | 9/1974 | Grudzinski |
| 3,834,912 A | 9/1974 | Grudzinski |
| 3,851,899 A | 12/1974 | Franz |
| 3,870,941 A | 3/1975 | Ikenga et al. |
| 3,915,291 A | 10/1975 | Vogts |
| 3,918,331 A | 11/1975 | Svanstrom |
| 3,932,961 A | 1/1976 | Pagella et al. |
| 3,997,111 A * | 12/1976 | Thomas ............... B05B 9/0403 239/596 |
| 3,999,384 A | 12/1976 | Mohaupt |
| 4,006,890 A | 2/1977 | Vainer et al. |
| 4,009,860 A | 3/1977 | Lingnau |
| 4,026,322 A | 5/1977 | Thomas |
| 4,029,440 A | 6/1977 | Olsen |
| 4,031,369 A | 6/1977 | Heaman et al. |
| 4,042,178 A | 8/1977 | Veltrup et al. |
| 4,048,841 A | 9/1977 | Kent |
| 4,048,918 A | 9/1977 | Peck |
| 4,050,001 A | 9/1977 | Kishi et al. |
| 4,050,862 A | 9/1977 | Buse |
| 4,065,953 A | 1/1978 | Frentzen et al. |
| 4,066,944 A | 1/1978 | Leenhouts |
| 4,075,789 A | 2/1978 | Dremann |
| 4,078,727 A | 3/1978 | Lingnau |
| 4,081,200 A | 3/1978 | Cheung |
| 4,081,892 A | 4/1978 | Mercer |
| 4,084,083 A | 4/1978 | McNally et al. |
| 4,089,199 A | 5/1978 | Siemonsen |
| 4,090,382 A | 5/1978 | Schott |
| 4,102,611 A | 7/1978 | Broker |
| 4,125,969 A | 11/1978 | Easton |
| 4,134,430 A | 1/1979 | Mukasa et al. |
| 4,146,355 A | 3/1979 | Broker et al. |
| 4,162,763 A | 7/1979 | Higgins |
| 4,164,183 A | 8/1979 | Peck |
| 4,173,435 A | 11/1979 | Hammelmann |
| 4,184,817 A | 1/1980 | Pareja |
| 4,186,584 A | 2/1980 | Schott |
| 4,192,343 A | 3/1980 | Grahac |
| 4,195,669 A | 4/1980 | Ives et al. |
| 4,195,970 A | 4/1980 | Zalis |
| 4,203,022 A | 5/1980 | Couch, Jr. et al. |
| 4,205,828 A | 6/1980 | Hooper et al. |
| 4,214,192 A | 7/1980 | Bromer et al. |
| 4,216,415 A | 8/1980 | Shimonou et al. |
| 4,216,906 A | 8/1980 | Olsen et al. |
| 4,216,911 A | 8/1980 | Huperz et al. |
| 4,237,913 A | 12/1980 | Maasberg |
| 4,246,838 A | 1/1981 | Pulver et al. |
| 4,253,610 A | 3/1981 | Larkin |
| 4,256,139 A | 3/1981 | Huperz et al. |
| 4,261,769 A | 4/1981 | Usui |
| 4,262,757 A | 4/1981 | Johnson, Jr. et al. |
| 4,270,379 A | 6/1981 | Van Gompel |
| 4,272,017 A | 6/1981 | Franz |
| 4,272,108 A | 6/1981 | Maasberg |
| 4,277,229 A | 7/1981 | Pacht |
| 4,282,763 A | 8/1981 | Griebeler |
| 4,306,627 A | 12/1981 | Cheung et al. |
| 4,306,728 A | 12/1981 | Huperz et al. |
| 4,313,570 A | 2/1982 | Olsen |
| 4,326,937 A | 4/1982 | Neumeier et al. |
| 4,339,897 A | 7/1982 | Thompson et al. |
| 4,361,748 A | 11/1982 | Couch, Jr. |
| 4,371,001 A | 2/1983 | Olsen |
| 4,392,534 A | 7/1983 | Miida |
| 4,392,784 A | 7/1983 | Hanafi |
| 4,401,345 A | 8/1983 | Archibald |
| 4,404,507 A | 9/1983 | Dean et al. |
| 4,412,792 A | 11/1983 | LaBorde et al. |
| 4,415,867 A | 11/1983 | Rubin |
| 4,428,275 A | 1/1984 | Huperz et al. |
| 4,435,902 A | 3/1984 | Mercer et al. |
| 4,437,525 A | 3/1984 | O'Hanlon et al. |
| 4,447,178 A | 5/1984 | Esser |

(56) References Cited

U.S. PATENT DOCUMENTS

| | | |
|---|---|---|
| 4,456,132 A | 6/1984 | LaValle et al. |
| 4,456,440 A | 6/1984 | Korner |
| 4,456,863 A | 6/1984 | Matusek |
| 4,477,237 A | 10/1984 | Grable |
| 4,478,368 A | 10/1984 | Yie |
| 4,494,415 A | 1/1985 | Elliston |
| 4,495,845 A | 1/1985 | Sherby |
| 4,524,544 A | 6/1985 | Habib |
| 4,527,957 A | 7/1985 | Dettinger et al. |
| 4,534,427 A | 8/1985 | Wang et al. |
| 4,536,135 A | 8/1985 | Olsen et al. |
| 4,540,056 A | 9/1985 | O'Hanlon |
| 4,540,320 A | 9/1985 | Arnold |
| 4,545,157 A | 10/1985 | Saurwein |
| 4,555,758 A | 11/1985 | Inaba et al. |
| 4,555,872 A | 12/1985 | Yie |
| 4,556,371 A | 12/1985 | Post |
| 4,557,245 A | 12/1985 | Bieri |
| 4,564,995 A | 1/1986 | Kase |
| 4,566,370 A | 1/1986 | Hanafi |
| 4,573,886 A | 3/1986 | Maasberg et al. |
| 4,574,825 A | 3/1986 | Haug |
| 4,578,748 A | 3/1986 | Abe et al. |
| 4,594,924 A | 6/1986 | Windisch |
| 4,598,380 A | 7/1986 | Holmes et al. |
| 4,600,985 A | 7/1986 | Nozawa et al. |
| 4,606,150 A | 8/1986 | Grimm |
| 4,614,128 A | 9/1986 | Fickler |
| 4,616,983 A | 10/1986 | Hanafi |
| 4,626,756 A | 12/1986 | Inaba et al. |
| 4,634,353 A | 1/1987 | Huperz |
| 4,644,460 A | 2/1987 | Kishi et al. |
| 4,648,215 A | 3/1987 | Hashish et al. |
| 4,651,601 A | 3/1987 | Sasaki |
| 4,660,773 A | 4/1987 | O'Hanlon |
| 4,665,944 A | 5/1987 | Wallace et al. |
| 4,666,083 A | 5/1987 | Yie |
| 4,669,760 A | 6/1987 | Hashish et al. |
| 4,669,783 A | 6/1987 | Kolle |
| 4,674,239 A | 6/1987 | Jodoin |
| 4,687,426 A | 8/1987 | Yoshimura |
| 4,697,769 A | 10/1987 | Blackwelder et al. |
| 4,715,538 A | 12/1987 | Lingnau |
| 4,728,872 A | 3/1988 | Kishi et al. |
| 4,729,720 A | 3/1988 | Fujita |
| 4,738,174 A | 4/1988 | Bloomquist |
| 4,741,680 A | 5/1988 | Broker et al. |
| 4,762,051 A | 8/1988 | Besic et al. |
| 4,764,394 A | 8/1988 | Conrad |
| 4,768,702 A | 9/1988 | Takahashi et al. |
| 4,776,769 A | 10/1988 | Hilaris |
| 4,780,064 A | 10/1988 | Olsen |
| 4,785,027 A | 11/1988 | Brasington et al. |
| 4,790,732 A | 12/1988 | Yamatani |
| 4,798,094 A | 1/1989 | Newhall et al. |
| 4,802,312 A | 2/1989 | Glaeser et al. |
| 4,815,241 A | 3/1989 | Woodson |
| 4,816,284 A | 3/1989 | Magee |
| 4,817,342 A | 4/1989 | Martin et al. |
| 4,817,874 A | 4/1989 | Jarzebowicz |
| 4,818,194 A | 4/1989 | Saurwein |
| 4,821,467 A | 4/1989 | Woodson et al. |
| 4,822,218 A | 4/1989 | Satoh |
| 4,823,550 A | 4/1989 | Decker |
| 4,852,800 A | 8/1989 | Murdock |
| 4,878,320 A | 11/1989 | Woodson |
| 4,878,815 A | 11/1989 | Stachowiak |
| 4,893,753 A | 1/1990 | Munoz et al. |
| 4,903,388 A | 2/1990 | Skonvall |
| 4,907,371 A | 3/1990 | Shoda et al. |
| 4,920,495 A | 4/1990 | Pilkington |
| 4,926,667 A | 5/1990 | Markiewicz et al. |
| 4,934,111 A | 6/1990 | Hashish et al. |
| 4,951,429 A | 8/1990 | Hashish et al. |
| 4,955,164 A | 9/1990 | Hashish |
| 4,960,039 A | 10/1990 | Robertson |
| 4,973,026 A | 11/1990 | Saurwein |
| 4,987,668 A | 1/1991 | Roesch |
| 5,018,670 A | 5/1991 | Chalmers |
| 5,037,276 A * | 8/1991 | Tremoulet, Jr. ...... F04B 53/103 417/470 |
| 5,037,277 A | 8/1991 | Tan |
| 5,040,396 A | 8/1991 | Mikhail et al. |
| 5,040,405 A | 8/1991 | Honma et al. |
| 5,051,555 A | 9/1991 | Porterfield et al. |
| 5,052,089 A | 10/1991 | Gadaud et al. |
| 5,084,791 A | 1/1992 | Thanos et al. |
| 5,098,229 A | 3/1992 | Meier et al. |
| 5,099,677 A | 3/1992 | Tokura |
| 5,102,312 A | 4/1992 | Harvey |
| 5,107,630 A | 4/1992 | Lodewijk |
| 5,117,872 A | 6/1992 | Yie |
| 5,154,643 A | 10/1992 | Catania et al. |
| 5,160,802 A | 11/1992 | Moscrip |
| 5,120,084 A | 12/1992 | Hashimoto |
| 5,172,939 A | 12/1992 | Hashimoto |
| 5,176,018 A | 1/1993 | Thompson |
| 5,186,157 A | 2/1993 | Bieri |
| 5,186,393 A | 2/1993 | Yie |
| 5,198,285 A | 3/1993 | Arai et al. |
| 5,199,642 A | 4/1993 | Rankin |
| 5,201,150 A | 4/1993 | Kuboyama et al. |
| 5,209,406 A | 5/1993 | Johnson |
| 5,214,972 A | 6/1993 | Larson et al. |
| 5,226,799 A | 7/1993 | Raghavan et al. |
| 5,236,459 A | 8/1993 | Koch et al. |
| 5,239,788 A | 8/1993 | Woodson |
| 5,249,161 A | 9/1993 | Jones et al. |
| 5,253,808 A | 10/1993 | Pacht |
| 5,255,853 A | 10/1993 | Munoz |
| 5,286,006 A | 2/1994 | Ogura |
| 5,297,777 A | 3/1994 | Yie |
| 5,317,873 A | 6/1994 | Okuda et al. |
| 5,320,289 A | 6/1994 | Hashish et al. |
| 5,330,167 A | 7/1994 | Plumb |
| 5,335,459 A | 8/1994 | Dale |
| 5,337,561 A | 8/1994 | Raghavan et al. |
| 5,351,714 A | 10/1994 | Barnowski |
| 5,352,254 A | 10/1994 | Celikkaya |
| 5,372,540 A | 12/1994 | Burch et al. |
| 5,380,159 A | 1/1995 | Olsen et al. |
| 5,407,379 A | 4/1995 | Shank et al. |
| 5,411,380 A | 5/1995 | Bristol et al. |
| 5,413,270 A | 5/1995 | Lechervy et al. |
| 5,441,441 A | 8/1995 | Cook et al. |
| 5,468,066 A | 11/1995 | Hammonds |
| 5,469,768 A | 11/1995 | Schumacher |
| 5,472,367 A | 12/1995 | Slocum et al. |
| 5,475,196 A | 12/1995 | Lisec |
| 5,484,325 A | 1/1996 | Shank |
| 5,505,653 A | 4/1996 | Nedo et al. |
| 5,508,596 A | 4/1996 | Olsen |
| 5,509,849 A | 4/1996 | Spears, Jr. |
| 5,524,821 A | 6/1996 | Yie et al. |
| 5,557,154 A | 9/1996 | Erhart |
| 5,564,184 A | 10/1996 | Dinh |
| 5,564,469 A | 10/1996 | Tremoulet, Jr. et al. |
| 5,577,390 A | 11/1996 | Kaido et al. |
| 5,616,067 A | 4/1997 | Goenka |
| 5,636,789 A | 6/1997 | Shook |
| 5,637,030 A | 6/1997 | Chopra et al. |
| 5,643,058 A | 7/1997 | Erichsen et al. |
| 5,649,694 A | 7/1997 | Buck |
| 5,679,058 A | 10/1997 | Rhoades |
| 5,685,190 A | 11/1997 | Yamamoto et al. |
| 5,704,824 A | 1/1998 | Hashish et al. |
| 5,722,688 A | 3/1998 | Garcia |
| 5,727,773 A | 3/1998 | Dunnigan |
| 5,730,358 A | 3/1998 | Raghavan et al. |
| 5,730,635 A | 3/1998 | De Haas et al. |
| 5,752,313 A | 5/1998 | Gaffaney et al. |
| 5,759,086 A | 6/1998 | Klingel |
| 5,771,873 A | 6/1998 | Potter et al. |
| 5,794,858 A | 8/1998 | Munoz |

(56) References Cited

U.S. PATENT DOCUMENTS

| | | | |
|---|---|---|---|
| 5,799,688 | A | 9/1998 | Yie |
| 5,800,134 | A | 9/1998 | Hasegawa et al. |
| 5,800,231 | A | 9/1998 | De Haas et al. |
| 5,800,246 | A | 9/1998 | Tomioka |
| 5,806,390 | A | 9/1998 | Pomerleau et al. |
| 5,831,403 | A | 11/1998 | Kanki et al. |
| 5,837,921 | A | 11/1998 | Rinaldi et al. |
| 5,848,880 | A | 12/1998 | Helmig |
| 5,851,139 | A | 12/1998 | Xu |
| 5,856,631 | A | 1/1999 | Julien |
| 5,876,267 | A | 3/1999 | Kanda |
| 5,892,345 | A | 4/1999 | Olsen |
| 5,904,297 | A | 5/1999 | Kendrick, Jr. et al. |
| 5,908,349 | A | 6/1999 | Warehime |
| 5,916,321 | A | 6/1999 | Holmes |
| 5,924,853 | A | 7/1999 | Pacht |
| 5,927,329 | A | 7/1999 | Yie |
| 5,948,332 | A | 9/1999 | Prenger |
| 5,970,996 | A | 10/1999 | Markey et al. |
| 5,975,429 | A | 11/1999 | Jezek |
| 5,975,864 | A | 11/1999 | De Santis et al. |
| 5,979,945 | A | 11/1999 | Hitachi et al. |
| 5,992,904 | A | 11/1999 | Hitachi et al. |
| 6,077,152 | A | 6/2000 | Warehime |
| 6,083,001 | A | 7/2000 | Deardon et al. |
| 6,098,677 | A | 8/2000 | Wegman et al. |
| 6,099,388 | A | 8/2000 | Fritsch et al. |
| 6,120,351 | A | 9/2000 | Zeng |
| 6,121,744 | A | 9/2000 | Hoda et al. |
| 6,126,524 | A | 10/2000 | Shepherd |
| 6,136,386 | A | 10/2000 | Nakahigashi et al. |
| 6,139,288 | A | 10/2000 | Karasawa |
| 6,152,014 | A | 11/2000 | Willimczik |
| 6,155,092 | A | 12/2000 | Sahlem |
| 6,155,245 | A | 12/2000 | Zanzuri |
| 6,162,031 | A | 12/2000 | Tremoulet |
| 6,163,955 | A | 12/2000 | Tsai |
| 6,168,503 | B1 | 1/2001 | Pao et al. |
| 6,171,070 | B1 | 1/2001 | Mitake |
| 6,213,095 | B1 | 4/2001 | Asada et al. |
| 6,220,529 | B1 | 4/2001 | Xu |
| 6,227,087 | B1 | 5/2001 | Thorson et al. |
| 6,227,768 | B1 | 5/2001 | Higuchi et al. |
| 6,241,492 | B1 | 6/2001 | Pacht |
| 6,244,927 | B1 | 6/2001 | Zeng |
| 6,264,439 | B1 | 7/2001 | Falk et al. |
| 6,276,993 | B1 | 8/2001 | Miller |
| 6,279,363 | B1 | 8/2001 | Averbuch et al. |
| 6,280,302 | B1 | 8/2001 | Hashish et al. |
| 6,283,833 | B1 | 9/2001 | Pao et al. |
| 6,299,510 | B1 | 10/2001 | Massenburg |
| 6,328,638 | B1 | 12/2001 | Hopkins et al. |
| 6,354,126 | B1 | 3/2002 | Small et al. |
| 6,361,416 | B1 | 3/2002 | Hopkins et al. |
| 6,375,547 | B1 | 4/2002 | Massenburg |
| 6,379,214 | B1 | 4/2002 | Stewart et al. |
| 6,408,826 | B2 | 6/2002 | Asada et al. |
| 6,415,820 | B1 | 7/2002 | Gluf, Jr. |
| 6,425,804 | B1 | 7/2002 | Petit et al. |
| 6,425,805 | B1 | 7/2002 | Massa et al. |
| 6,430,787 | B1 | 8/2002 | Becan et al. |
| 6,431,465 | B1 | 8/2002 | Yie |
| 6,443,705 | B1 | 9/2002 | Munoz |
| 6,450,546 | B1 | 9/2002 | Montgomery et al. |
| 6,454,548 | B2 | 9/2002 | Falk et al. |
| 6,497,219 | B2 | 12/2002 | Natsume |
| D470,566 | S | 2/2003 | Sciulli et al. |
| 6,533,640 | B1 | 3/2003 | Nopwaskey et al. |
| 6,533,643 | B1 | 3/2003 | Feng |
| 6,540,586 | B2 | 4/2003 | Sciulli |
| 6,544,012 | B1 | 4/2003 | Blume |
| 6,548,173 | B2 | 4/2003 | Erdemir et al. |
| 6,588,724 | B2 | 7/2003 | Yie |
| 6,619,099 | B2 | 9/2003 | Barjesteh |
| 6,619,570 | B1 | 9/2003 | Ericksen et al. |
| 6,622,612 | B2 | 9/2003 | Notzon |
| 6,632,324 | B2 | 10/2003 | Chan |
| 6,676,039 | B2 | 1/2004 | Lindsey et al. |
| 6,684,133 | B2 | 1/2004 | Frye-Hammelmann et al. |
| 6,705,921 | B1 | 3/2004 | Shepherd |
| 6,752,685 | B2 | 6/2004 | Ulrich et al. |
| 6,766,216 | B2 | 7/2004 | Erichsen et al. |
| 6,802,541 | B2 | 10/2004 | Hopinks et al. |
| 6,810,615 | B2 | 11/2004 | Hermanson et al. |
| 6,819,974 | B1 | 11/2004 | Coleman et al. |
| 6,852,002 | B2 | 2/2005 | Stewart et al. |
| 6,860,517 | B2 | 3/2005 | Sanders |
| 6,870,346 | B2 | 3/2005 | Davidov |
| 6,879,415 | B2 | 4/2005 | Kurosawa |
| 6,893,720 | B1 | 5/2005 | Nakahigashi et al. |
| 6,913,447 | B2 | 7/2005 | Fox et al. |
| 6,919,288 | B2 | 7/2005 | Yamamoto et al. |
| 6,922,605 | B1 | 7/2005 | Olsen |
| 6,931,776 | B2 | 8/2005 | Wagner et al. |
| 6,932,285 | B1 | 8/2005 | Zeng |
| 6,959,908 | B2 | 11/2005 | Isbitsky |
| 6,960,069 | B2 | 11/2005 | Maruta et al. |
| 6,970,793 | B2 | 11/2005 | Pearson et al. |
| 6,979,125 | B2 | 12/2005 | Vicars |
| 7,033,256 | B2 | 4/2006 | Miller |
| 7,035,708 | B1 | 4/2006 | Olsen |
| 7,040,959 | B1 | 5/2006 | Panuska et al. |
| 7,073,611 | B2 | 7/2006 | Sui et al. |
| 7,074,112 | B2 | 7/2006 | Olsen |
| 7,083,124 | B2 | 8/2006 | Bednorz et al. |
| 7,090,054 | B2 | 8/2006 | Iwamasa et al. |
| 7,094,135 | B2 | 8/2006 | Chisum et al. |
| 7,108,585 | B1 | 9/2006 | Dorman et al. |
| 7,121,812 | B2 | 10/2006 | Forrest |
| 7,134,851 | B2 | 11/2006 | Chenoweth |
| 7,153,186 | B2 | 12/2006 | Popescu et al. |
| 7,162,943 | B1 | 1/2007 | Reitmeyer et al. |
| 7,165,396 | B2 | 1/2007 | Zumbusch |
| 7,207,868 | B2 | 4/2007 | Takehara et al. |
| 7,225,660 | B1 | 6/2007 | Ledebur |
| 7,247,006 | B2 | 7/2007 | Hopkins et al. |
| 7,357,697 | B2 | 4/2008 | Massa et al. |
| 7,367,789 | B2 * | 5/2008 | Raghavan ............ F04B 53/007 417/571 |
| 7,383,896 | B2 | 6/2008 | Tibbitts |
| 7,419,418 | B2 | 9/2008 | Alberts et al. |
| 7,464,630 | B2 | 12/2008 | Knaupp et al. |
| 7,465,215 | B2 | 12/2008 | Shimizu et al. |
| 7,485,027 | B2 | 2/2009 | Miller |
| 7,523,694 | B2 * | 4/2009 | Aday ................... F04B 53/166 92/171.1 |
| 7,537,019 | B2 | 5/2009 | Ting et al. |
| 7,544,112 | B1 | 6/2009 | Miller et al. |
| 7,560,892 | B2 | 7/2009 | Shibaski et al. |
| 7,568,424 | B2 | 8/2009 | Hopkins et al. |
| 7,585,201 | B2 | 9/2009 | Kanai et al. |
| 7,594,614 | B2 | 9/2009 | Vijay et al. |
| 7,703,363 | B2 | 4/2010 | Knaupp et al. |
| 7,748,750 | B2 | 7/2010 | Raghavan et al. |
| 7,757,786 | B2 | 7/2010 | Harder et al. |
| 7,815,490 | B2 | 10/2010 | Liu |
| 7,818,986 | B1 | 10/2010 | Parker et al. |
| 7,832,481 | B2 | 11/2010 | Martindale |
| 7,896,726 | B1 | 3/2011 | Miller et al. |
| 7,905,711 | B2 | 3/2011 | Mochizuki et al. |
| 7,917,017 | B2 | 3/2011 | Kanamori |
| 7,938,713 | B2 | 5/2011 | Trieb et al. |
| 7,946,147 | B2 | 5/2011 | Shimai et al. |
| 8,024,068 | B2 | 9/2011 | Gray |
| 8,123,591 | B2 | 2/2012 | Olsen |
| 8,240,634 | B2 | 8/2012 | Jarchau et al. |
| 8,267,672 | B2 | 9/2012 | Kellar et al. |
| 8,277,206 | B2 | 10/2012 | Raghavan et al. |
| 8,308,525 | B2 | 11/2012 | Hashish et al. |
| 8,322,997 | B2 | 12/2012 | Auer et al. |
| 8,342,912 | B2 | 1/2013 | Funatsu |
| 8,401,692 | B2 | 3/2013 | Knaupp et al. |
| 8,439,647 | B2 | 5/2013 | Miller |
| 8,475,230 | B2 | 7/2013 | Summers et al. |

(56) References Cited

U.S. PATENT DOCUMENTS

| | | |
|---|---|---|
| 8,534,787 B2 | 9/2013 | Yafe |
| 8,541,710 B2 | 9/2013 | Brandt et al. |
| 8,573,244 B2 | 11/2013 | Taylor |
| 8,593,086 B2 | 11/2013 | Hay et al. |
| 8,651,920 B2 | 2/2014 | Hashish |
| 8,664,084 B2 | 3/2014 | Deguet et al. |
| 8,821,213 B2 | 9/2014 | Liu et al. |
| 8,892,236 B2 | 11/2014 | Olsen |
| 8,904,912 B2 | 12/2014 | Raghavan et al. |
| 8,910,409 B1 | 12/2014 | Fonte |
| 8,920,213 B2 | 12/2014 | Liu |
| 8,984,926 B2 | 3/2015 | Davidsen |
| 9,003,955 B1 | 4/2015 | Stang et al. |
| 9,011,204 B2 | 4/2015 | Raghavan et al. |
| 9,044,873 B2 | 6/2015 | Guglielmetti et al. |
| 9,050,704 B1 | 6/2015 | Liu et al. |
| 9,067,331 B2 | 6/2015 | Stang |
| 9,090,808 B1 | 7/2015 | Liu et al. |
| 9,095,955 B2 | 8/2015 | Raghavan et al. |
| 9,108,297 B2 | 8/2015 | Schubert et al. |
| 9,138,863 B2 | 9/2015 | Schubert et al. |
| 9,163,617 B2 | 10/2015 | Mann |
| 9,272,437 B2 | 3/2016 | Hashish et al. |
| 9,273,682 B2 | 3/2016 | Stang |
| 9,283,656 B2 | 3/2016 | Schubert et al. |
| 9,309,873 B2 | 4/2016 | Roll |
| 9,370,871 B2 | 6/2016 | Hashish |
| 9,375,771 B2 | 6/2016 | Fonte |
| 9,492,908 B2 | 11/2016 | Schubert et al. |
| 9,573,289 B2 | 2/2017 | Hashish et al. |
| 9,574,684 B1 | 2/2017 | Fonte |
| 9,586,306 B2 | 3/2017 | Zhang et al. |
| 9,610,674 B2 | 4/2017 | Raghavan et al. |
| 9,636,799 B2 | 5/2017 | Liu et al. |
| 9,638,357 B1 | 5/2017 | Raghavan et al. |
| 9,649,744 B2 | 5/2017 | Raghavan et al. |
| 9,658,613 B2 | 5/2017 | Henning et al. |
| 9,720,399 B2 | 8/2017 | Henning et al. |
| 9,727,051 B2 | 8/2017 | Henning et al. |
| 9,772,620 B2 | 9/2017 | Henning et al. |
| 9,810,205 B2 | 11/2017 | Raghavan et al. |
| 9,827,649 B2 | 11/2017 | Schubert et al. |
| 9,884,406 B2 | 2/2018 | Hashish et al. |
| 9,891,617 B2 | 2/2018 | Henning et al. |
| 9,976,675 B1 | 5/2018 | Raghavan et al. |
| 9,989,954 B2 | 6/2018 | Henning et al. |
| 10,010,999 B2 | 7/2018 | Raghavan et al. |
| 10,048,676 B2 | 8/2018 | Henning et al. |
| 10,054,118 B2 | 8/2018 | Hopkins |
| 10,146,209 B2 | 12/2018 | Henning et al. |
| 10,201,914 B2 | 2/2019 | Schlough et al. |
| 10,209,107 B2 | 2/2019 | Oki |
| 10,564,627 B2 | 2/2020 | Henning et al. |
| 10,606,240 B2 | 2/2020 | Henning et al. |
| 10,642,252 B2 | 5/2020 | Henning et al. |
| 10,656,622 B2 | 5/2020 | Henning et al. |
| 10,675,733 B2 | 6/2020 | Zhang et al. |
| 10,780,551 B2 | 9/2020 | Zhang et al. |
| 10,801,651 B2 | 10/2020 | Olsen et al. |
| 10,808,688 B1 | 10/2020 | Raghavan et al. |
| 10,859,994 B2 | 12/2020 | Chandler et al. |
| 10,859,997 B1 | 12/2020 | Miles et al. |
| 10,864,613 B2 | 12/2020 | Raghavan et al. |
| 10,900,501 B2 | 1/2021 | Trieb |
| 10,955,078 B2 * | 3/2021 | Mann ................. F04C 15/0049 |
| 10,981,259 B2 | 4/2021 | Lerea et al. |
| 10,983,503 B2 | 4/2021 | Henning et al. |
| 10,990,080 B2 | 4/2021 | Henning et al. |
| 11,125,360 B2 | 9/2021 | Raghavan et al. |
| D934,920 S | 11/2021 | Farnsworth et al. |
| 11,224,987 B1 | 1/2022 | Guglielmetti |
| D967,941 S | 10/2022 | Osterhouse et al. |
| D975,244 S | 1/2023 | Osterhouse et al. |
| 11,554,461 B1 | 1/2023 | Miles et al. |
| 11,577,366 B2 | 2/2023 | Schubert et al. |
| 11,630,433 B1 | 4/2023 | Miles et al. |
| 11,693,387 B2 | 7/2023 | Henning et al. |
| 11,719,354 B2 | 8/2023 | Osterhouse et al. |
| 2001/0002562 A1 | 6/2001 | Moutafis et al. |
| 2001/0030245 A1 | 10/2001 | Lindsey et al. |
| 2001/0048883 A1 | 12/2001 | Falk et al. |
| 2002/0056347 A1 | 5/2002 | Signey et al. |
| 2003/0034122 A1 | 2/2003 | Asai |
| 2003/0057295 A1 | 3/2003 | Helmig |
| 2003/0067168 A1 | 4/2003 | Sches et al. |
| 2003/0085295 A1 | 5/2003 | Dijkman et al. |
| 2003/0106591 A1 | 6/2003 | Saurwein et al. |
| 2003/0106594 A1 | 6/2003 | Saurwein et al. |
| 2003/0107021 A1 | 6/2003 | Saurwein et al. |
| 2003/0122376 A1 | 7/2003 | Hopkins et al. |
| 2003/0141617 A1 | 7/2003 | Prevotat et al. |
| 2003/0146229 A1 | 8/2003 | Munoz |
| 2003/0148709 A1 | 8/2003 | Anand et al. |
| 2003/0065424 A1 | 9/2003 | Erichsen et al. |
| 2004/0107810 A1 | 6/2004 | Sciulli et al. |
| 2004/0108000 A1 | 6/2004 | Raghavan et al. |
| 2004/0198179 A1 | 10/2004 | Gadd |
| 2005/0017091 A1 | 1/2005 | Olsen et al. |
| 2005/0074350 A1 | 4/2005 | Raghavan et al. |
| 2005/0098963 A1 | 5/2005 | Olsen |
| 2005/0121312 A1 | 6/2005 | Sui et al. |
| 2005/0173815 A1 | 8/2005 | Mueller |
| 2005/0252352 A1 | 11/2005 | Tateiwa |
| 2006/0223423 A1 | 10/2006 | Dorfman et al. |
| 2006/0237672 A1 | 10/2006 | Moreno et al. |
| 2007/0009367 A1 | 1/2007 | Tischler et al. |
| 2007/0021039 A1 | 1/2007 | Haslett |
| 2007/0037495 A1 | 2/2007 | Matsubara et al. |
| 2007/0063066 A1 | 3/2007 | Vijay et al. |
| 2007/0131455 A1 | 6/2007 | Blange |
| 2007/0155289 A1 | 7/2007 | Miller |
| 2007/0186604 A1 | 8/2007 | Koppensteiner |
| 2007/0203858 A1 | 8/2007 | Olsen |
| 2007/0218808 A1 | 9/2007 | Shimizu et al. |
| 2007/0252340 A1 | 11/2007 | Karl et al. |
| 2007/0267996 A1 | 11/2007 | Shibasaki et al. |
| 2008/0000065 A1 | 1/2008 | Ganguly et al. |
| 2008/0019851 A1 | 1/2008 | Hopkins et al. |
| 2008/0060493 A1 | 3/2008 | Liu |
| 2008/0110229 A1 | 5/2008 | Badlani et al. |
| 2008/0110311 A1 | 5/2008 | Stangherlin |
| 2008/0169581 A1 | 7/2008 | Fukushima et al. |
| 2008/0282855 A1 | 11/2008 | Kanai |
| 2009/0013839 A1 | 1/2009 | Kanai et al. |
| 2009/0064832 A1 | 3/2009 | Caretta et al. |
| 2009/0101730 A1 | 4/2009 | Davis et al. |
| 2009/0139595 A1 | 6/2009 | Kato et al. |
| 2009/0151701 A1 | 6/2009 | Kato et al. |
| 2009/0258582 A1 | 10/2009 | Miller |
| 2009/0272245 A1 | 11/2009 | Voice et al. |
| 2009/0288532 A1 | 11/2009 | Hashish |
| 2009/0311944 A1 | 12/2009 | Olsen |
| 2009/0318064 A1 | 12/2009 | Hashish |
| 2010/0003894 A1 | 1/2010 | Miller et al. |
| 2010/0064870 A1 | 3/2010 | Olsen |
| 2010/0066786 A1 | 3/2010 | Yafe |
| 2010/0124872 A1 | 5/2010 | Hashish et al. |
| 2010/0166573 A1 | 7/2010 | Magami et al. |
| 2010/0199740 A1 | 8/2010 | Muschalik et al. |
| 2010/0230953 A1 | 9/2010 | Baylot et al. |
| 2010/0257913 A1 | 10/2010 | Storm, Jr. et al. |
| 2010/0269593 A1 | 10/2010 | Moser et al. |
| 2010/0310384 A1 | 12/2010 | Stephenson et al. |
| 2010/0326271 A1 | 12/2010 | Stang |
| 2011/0005067 A1 | 1/2011 | McDaniel et al. |
| 2011/0011253 A1 | 1/2011 | Fonte |
| 2011/0084476 A1 | 4/2011 | Nishida |
| 2011/0135505 A1 | 6/2011 | Kieninger et al. |
| 2011/0232355 A1 | 9/2011 | Evans et al. |
| 2011/0269382 A1 | 11/2011 | Deleris |
| 2011/0297269 A1 | 12/2011 | Pilon et al. |
| 2012/0021676 A1 | 1/2012 | Schubert et al. |
| 2012/0085211 A1 | 4/2012 | Liu et al. |
| 2012/0091382 A1 | 4/2012 | Yie |

(56) References Cited

U.S. PATENT DOCUMENTS

| | | |
|---|---|---|
| 2012/0186518 A1 | 7/2012 | Herre et al. |
| 2012/0196516 A1 | 8/2012 | Funatsu et al. |
| 2012/0199218 A1 | 8/2012 | Gioberti et al. |
| 2012/0201706 A1 | 8/2012 | Liu et al. |
| 2012/0217011 A1 | 8/2012 | Dotson et al. |
| 2012/0238188 A1 | 9/2012 | Miller |
| 2012/0247296 A1 | 10/2012 | Stang et al. |
| 2012/0252325 A1 | 10/2012 | Schubert et al. |
| 2012/0252326 A1 | 10/2012 | Schubert et al. |
| 2012/0272764 A1 | 11/2012 | Pendleton |
| 2012/0282845 A1 | 11/2012 | Whang et al. |
| 2013/0005225 A1 | 1/2013 | Russo |
| 2013/0025425 A1 | 1/2013 | Knaupp et al. |
| 2013/0112074 A1 | 5/2013 | Small |
| 2013/0167697 A1 | 7/2013 | Reukers |
| 2013/0267152 A1 | 10/2013 | Tera et al. |
| 2014/0015202 A1 | 1/2014 | Chacko et al. |
| 2014/0015245 A1 | 1/2014 | Chiu |
| 2014/0045409 A1 | 2/2014 | Zhang et al. |
| 2014/0051334 A1 | 2/2014 | Raghavan et al. |
| 2014/0087631 A1 | 3/2014 | Raghavan et al. |
| 2014/0124184 A1 | 5/2014 | Tokura |
| 2014/0273768 A1 | 9/2014 | Guglielmetti et al. |
| 2014/0377485 A1 | 12/2014 | Berger et al. |
| 2015/0031270 A1 | 1/2015 | Miller |
| 2015/0053075 A1 | 2/2015 | Rabhi |
| 2015/0082606 A1 | 3/2015 | Nakajima et al. |
| 2015/0360344 A1 | 12/2015 | Raghavan et al. |
| 2016/0298614 A1 | 10/2016 | Gaillard |
| 2017/0165810 A1 | 6/2017 | Zhang et al. |
| 2017/0190021 A1 | 7/2017 | Zhang et al. |
| 2017/0297168 A1 | 10/2017 | Raghavan et al. |
| 2018/0150049 A1 | 5/2018 | Schranz et al. |
| 2018/0161958 A1 | 6/2018 | Schubert et al. |
| 2018/0264625 A1 | 9/2018 | Schneidau |
| 2018/0320802 A1 | 11/2018 | Raghavan et al. |
| 2018/0364679 A1 | 12/2018 | Henning et al. |
| 2019/0015928 A1 | 1/2019 | Hagenlocher et al. |
| 2019/0101894 A1 | 4/2019 | Henning et al. |
| 2019/0249805 A1 | 8/2019 | Olsen et al. |
| 2020/0007254 A1 | 1/2020 | Hay et al. |
| 2020/0406424 A1 | 12/2020 | Zhang et al. |
| 2021/0046610 A1 | 2/2021 | Schubert et al. |
| 2021/0154799 A1 | 5/2021 | Dean, Jr. et al. |
| 2021/0187778 A1 | 6/2021 | Denney et al. |
| 2021/0192922 A1 | 6/2021 | Vandergon et al. |
| 2021/0221534 A1 | 7/2021 | Henning et al. |
| 2021/0291332 A1 | 9/2021 | Vandergon et al. |
| 2021/0299903 A1* | 9/2021 | Osterhouse ............. B26F 3/004 |
| 2021/0301936 A1* | 9/2021 | Osterhouse ............. F04B 53/10 |
| 2022/0057774 A1 | 2/2022 | Vandergon et al. |
| 2023/0120907 A1 | 4/2023 | Miles et al. |
| 2023/0143795 A1 | 5/2023 | Schubert et al. |
| 2023/0191561 A1 | 6/2023 | Guglielmetti et al. |
| 2023/0191644 A1 | 6/2023 | Guglielmetti et al. |

FOREIGN PATENT DOCUMENTS

| | | |
|---|---|---|
| CN | 201827039 U | 5/2011 |
| CN | 102507171 A | 6/2012 |
| CN | 102632373 A | 8/2012 |
| CN | 202861228 U | 4/2013 |
| CN | 202955386 U | 5/2013 |
| DE | 4343820 A1 | 6/1995 |
| DE | 10214251 C1 | 8/2003 |
| DE | 202013104815 U1 | 2/2014 |
| EP | 0165690 A2 | 12/1985 |
| EP | 0391489 A1 | 10/1990 |
| EP | 1116543 A2 | 7/2001 |
| EP | 2236893 A2 | 10/2010 |
| FR | 2452969 A1 | 10/1980 |
| GB | 1078145 A | 8/1967 |
| GB | 2198975 A | 6/1988 |
| JP | 61222677 A | 10/1986 |
| JP | 62055112 A1 | 3/1987 |
| JP | 2003088924 A | 3/2003 |
| JP | 2012157956 A | 8/2012 |
| JP | 2013086122 A | 5/2013 |
| KR | 1019930008692 B1 | 9/1993 |
| KR | 101678356 B1 | 11/2016 |
| WO | 94025209 A1 | 11/1994 |
| WO | 2002085572 A1 | 10/2002 |
| WO | 03011524 A1 | 2/2003 |
| WO | 03055644 A1 | 7/2003 |
| WO | 2009050251 A2 | 4/2009 |
| WO | 2011042244 A2 | 4/2011 |
| WO | 2013109473 A1 | 7/2013 |
| WO | 2013109474 A1 | 7/2013 |
| WO | 2018197018 A1 | 11/2018 |

OTHER PUBLICATIONS

Waterjet cutting head parts, 60k high pressure HP Cylinder body for Jet Edge / sunrise water jet head intensifier bump SR20004, copyright 2010-2020 AliExpress.com, https://www.aliexpress.com/item/33039960455.html [last accessed Mar. 29, 2021], 5 pages.

European Patent Office International Search Report and Written Opinion dated May 14, 2021 for PCT/US2021/024668 filed Mar. 29, 2021, Applicant: Hypertherm, Inc., 15 pages.

Davidson et al, "Residual Stresses in Thick-walled Cylinders Resulting from Mechanically Induced Overstrain," Experimental Mechanics, Nov. 1963, pp. 253-262.

Gibson et al., "Investigation of Residual Stress Development During Swage Autofrettage, Using Finite Element Analysis," Proceedings of the ASME 2009 International Mechanical Engineering Congress & Exposition, Nov. 13-19, 2009, 8 pages.

O'Hara, Peter G., "Analysis of the Swage Autofrettage Process," Technical Report ARCCB-TR-92016, U.S. Army Armament Research, Development and Engineering Center, Close Combat Armaments Center, Benet Laboratories, Watervliet, N.Y., Apr. 1992, 22 pages.

Gibson, Michael C., "Determination of Residual Stress Distributions in Autofrettaged Thick-Walled Cylinders," Department of Engineering Systems and Management Defense College of Management and Technology, Cranfield University, Apr. 2008, 302 pages.

Perl et al., "Is There an 'Ultimate' Autofrettage Process?," Journal of Pressure Vessel Technology, vol. 134, Aug. 2012, 5 pages.

"Fox Solids Conveying Eductors," http://www.flowmeterdirectory.com/solid_conveying_eductor.html, last accessed May 24, 2011, 2 pages.

OMAX Accessory Specifications A-Jet, Precision Abrasive Waterjet Accessories, Jan. 2010.

Hashish, M., "Waterjet Machine Tool of the Future," $9^{th}$ American Waterjet Conference, Aug. 23-26, 1997, Dearborn, Michigan, Paper No. 58, 15 pages.

Miller, D.S., "New Abrasive Waterjet Systems to Compete with Lasers," 2005 WJTA American Waterjet Conference, Aug. 21-23, 2005, Houston, Texas, 11 pages.

Hu et al., Computer Modeling and Optimization of Swage Autofrettage Process of a Thick-Walled Cylinder Incorporating Bauschinger Effect, Jan. 14, 2014, American Transactions on Engineering & Applied Sciences, vol. 3, pp. 31-63.

American Rifleman, Ruger New Model Single-Six .17 HMR, Sep. 2003, pp. 90-96, Year: 2003.

Stress Concentration—Wikipedia, http://wikipedia.org/wiki/Stress_concentration, accessed Oct. 5, 2011, 3 pages.

"Memory water jet milling," available from http://www.computescotland.com/memory-water-jet-milling5236.php, Apr. 24, 2012, 4 pages.

Nendzig, Gerhard, English language translation of "Vier ist besser als drei?!, Oszillierende Verdrangerpumpen unter der Lupe," CAV Oct. 2007, www.cav.de , 6 pages.

* cited by examiner

CYLINDER FOR A LIQUID JET PUMP WITH MULTI-FUNCTIONAL INTERFACING LONGITUDINAL ENDS

CROSS-REFERENCE TO RELATED APPLICATIONS INCORPORATED BY REFERENCE

The present application claims priority to U.S. Provisional App. No. 63/002,155, titled CYLINDER FOR A LIQUID JET PUMP WITH MULTI-FUNCTIONAL INTERFACING LONGITUDINAL ENDS, AND LOW WEIGHT TO VOLUME RATIO HYDRAULIC RESERVOIR FOR A LIQUID JET PUMP, which was filed on Mar. 30, 2020, and is incorporated herein by reference in its entirety.

TECHNICAL FIELD

The present disclosure is generally related to cylinders for liquid jet cutting systems.

BACKGROUND

Many pressurization systems (e.g., intensifiers, direct-drive pumps, etc.) in the field of liquid jet cutting have longitudinally unsymmetrical cylinders. This can create difficulty during maintenance and the potential for mis-assembly during maintenance, as an end user may not correctly orient the cylinder for installation into the intensifier (e.g., the user may install each longitudinal end into an incorrect portion of the system).

Some pressurization systems have a symmetrical cylinder (e.g., a cylinder having identical longitudinal ends). However, the ends of these cylinders serve the same function with the surrounding components and contact surfaces, independent of orientation. While this symmetrical cylinder design reduces the chances of operator maintenance errors, it places constraints on the designer as the mating parts on the two ends both function and interface the same way with the adjacent components in the liquid pressurization system, utilizing the exact same critical contact surfaces for sealing and balanced load bearing on each end of the cylinder. When using these cylinders in such a manner, damage and/or wear to any of the functional features and/or interface surfaces renders the cylinder unusable—a particularly undesirable result for interfaces that are exposed to significant wear during operation.

DETAILED DESCRIPTION

The following disclosure describes various embodiments of high-pressure cylinder for liquid jet cutting systems. The cylinders can be circumferentially and/or axially symmetric. The cylinders can include a first end portion, a second end portion, and a central bore configured to receive a plunger. The first end portion can have a first tapered surface (e.g., a first surface) configured to form a seal with a mating surface of a check valve when the high-pressure cylinder is in a first orientation, and a first annular surface (e.g., a second surface) configured to bear against a mating surface of a pump when the high-pressure cylinder is in a second orientation rotated 180 degrees end-over-end from the first orientation. The second end portion can have a second annular tapered surface (e.g., a first surface) configured to form a seal with the mating surface of the check valve when the high-pressure cylinder is in the second orientation, and a second annular surface (e.g., a second surface) configured to bear against the mating surface of the pump when the high-pressure cylinder is in the first orientation.

In the Figures, identical reference numbers identify identical, or at least generally similar, elements. To facilitate the discussion of any particular element, the most significant digit or digits of any reference number refers to the Figure in which that element is first introduced. For example, the cylinder 222 is first introduced and discussed with reference to FIG. 2.

Figure 1:
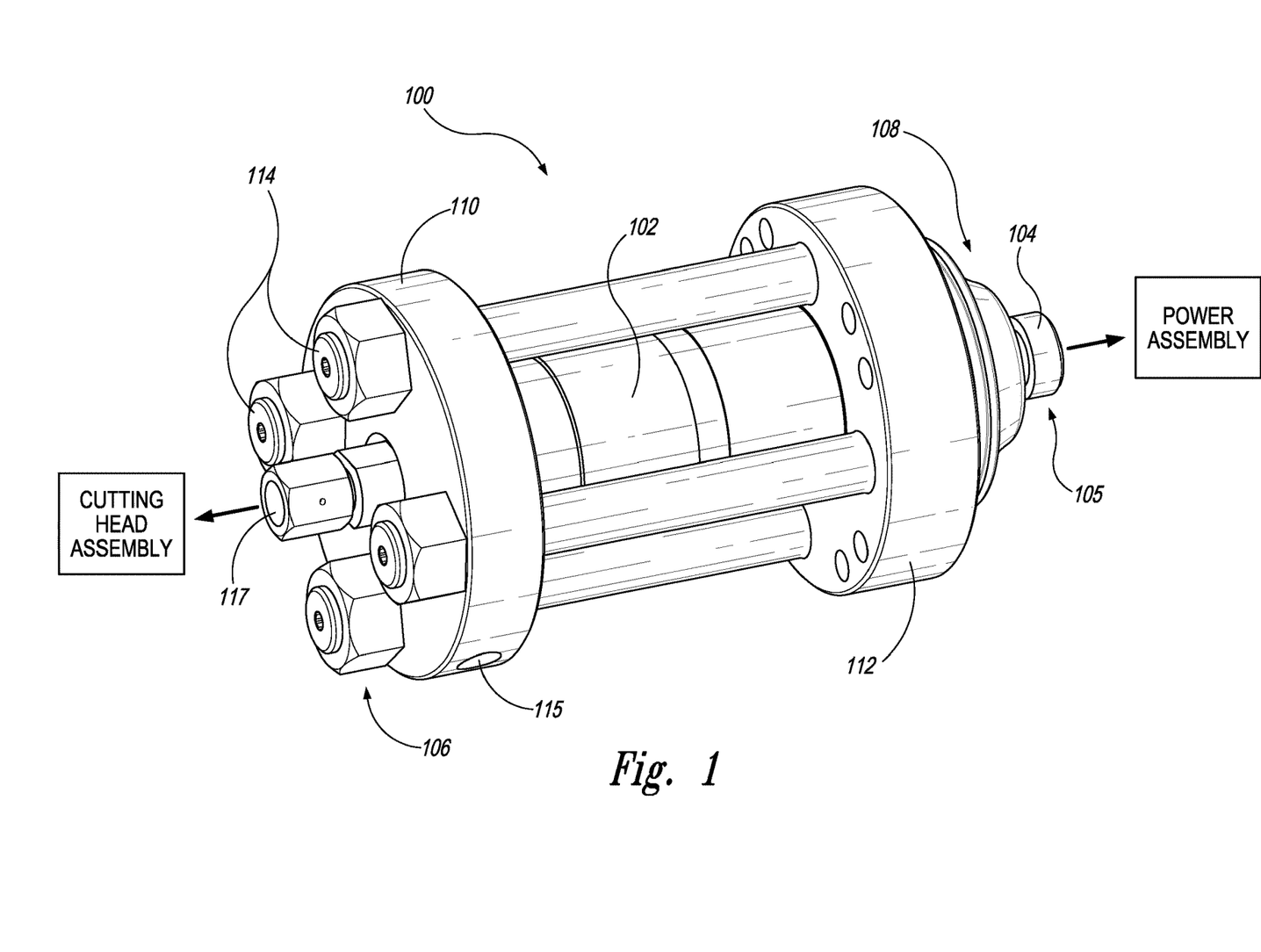
FIG. 1 is an isometric view of a liquid pressurization assembly configured in accordance with embodiments of the present technology.

FIG. 1 is an isometric view of a liquid pressurization assembly 100 configured in accordance with embodiments of the present technology. The liquid pressurization assembly 100 can include a cylinder assembly 102. The cylinder assembly 102 can be configured to receive at least a portion of a plunger 104 configured to reciprocate within the cylinder assembly 102 and pressurize liquid for output to a liquid jet cutting head assembly (not shown) via an inlet/outlet end portion 106. The plunger 104 can be reciprocated by a power assembly (not shown) operably coupled to a dynamic end portion 108 of the liquid pressurization assembly 100. In some embodiments, the power assembly can include components of a linear intensifier pump, e.g., a piston operably contained within a hydraulic cylinder that is fixedly attached to the pressurization assembly 100 in a conventional manner. In other embodiments, the power assembly can include components of a rotary direct drive pump, e.g., a crankshaft and associated connecting rod contained within a crankcase fixedly attached to the pressurization assembly 100 in a conventional manner. In such embodiments, the power assembly applies reciprocating forces to a proximal end portion 105 of the plunger 104 which, in some embodiments, extends outside of the liquid pressurization assembly 100. The cylinder assembly 102 can be captured between two endcaps or other retaining structures; one endcap 110 positioned at or near the inlet/outlet end portion 106, and the other endcap 112 positioned at or near the dynamic end portion 108. The endcaps 110, 112 can be fixedly connected to each other via one or more bolts 114 or other fasteners or connection means. In operation, the liquid jet pressurization assembly can be configured to receive low-pressure liquid via an inlet 115, pressurize the low-pressure liquid, and output high-pressure liquid to the liquid jet assembly via an outlet 117 and/or an outlet fitting 119 (FIG. 2).

Figure 2:
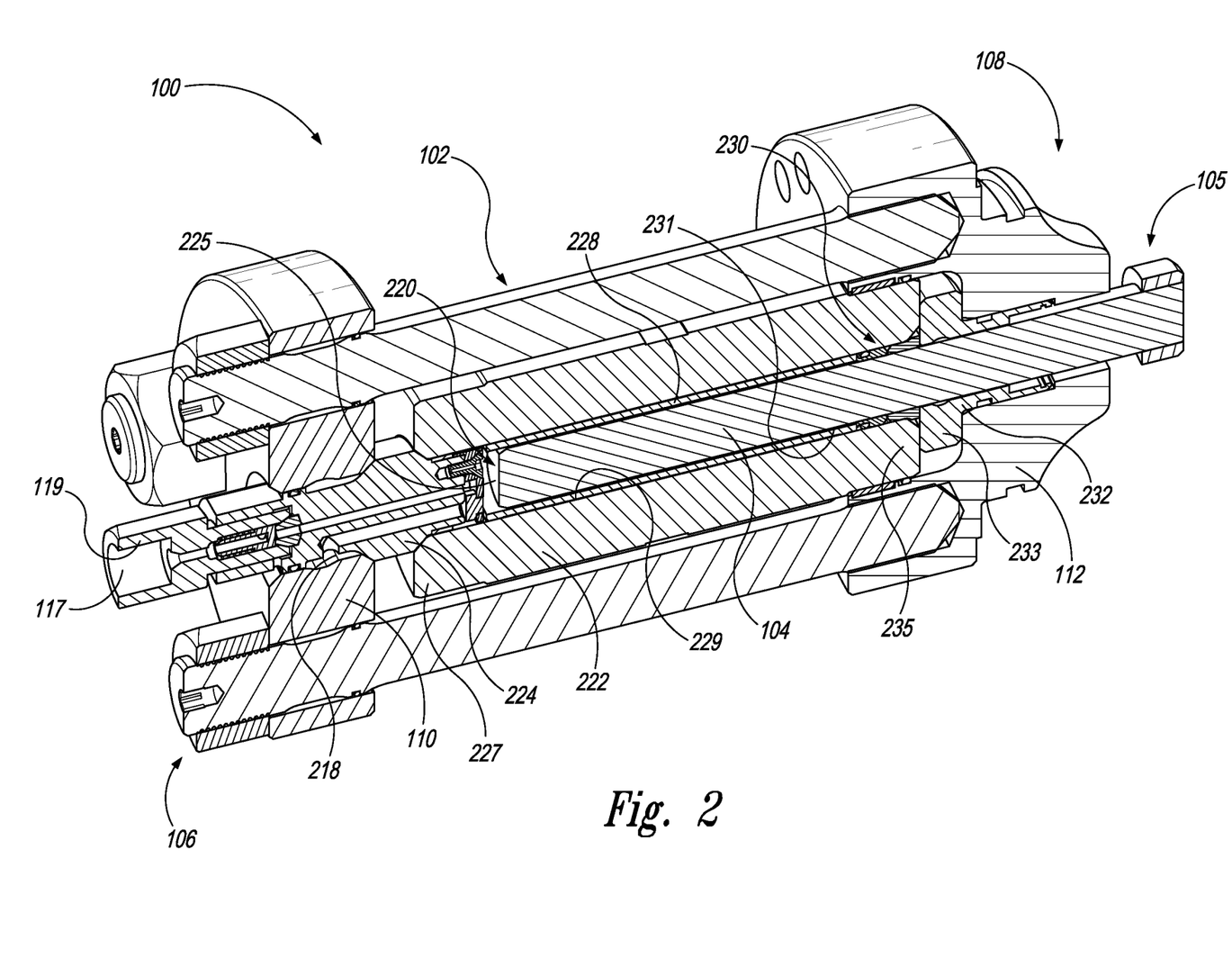
FIG. 2 is an isometric, side cross-sectional view of the liquid pressurization assembly of FIG. 1 configured in accordance with embodiments of the present technology.

FIG. 2 is an isometric, side cross-sectional view of the liquid pressurization assembly 100 of FIG. 1 illustrating a multi-function cylinder 222 configured in accordance with embodiments of the present technology. The liquid pressurization assembly 100 can include a check valve assembly 224. In some embodiments, the check valve assembly 224 is at least partially surrounded by the first endcap 110 and pressed into contact with a first end portion 227 of the cylinder 222 (e.g., a distal end portion, as oriented in FIG. 2) by the endcap 110. The cylinder assembly 102 can include spacer ring 228 (e.g., a cylindrical sleeve) surrounding at least a portion of the plunger 104 as the plunger 104 reciprocates within the cylinder 222. The spacer ring 228 can be configured to space components from each other (e.g., space components of the below-described seal assembly 230 from the plunger) and/or to displace liquid between the seal assembly 230 and the check valve assembly 224 within the cylinder 222. The cylinder assembly 102 can also include a seal assembly 230 operably positioned proximate the dynamic end portion 108 and opposite the check valve assembly 224. The seal assembly 230 can be configured to reduce or eliminate leakage of high-pressure fluid through the space between the inner sidewall 229 of the cylinder 222 and the outer sidewall 231 of the plunger 104. In some embodiments, the seal assembly 230 is positioned at least partially within the space between the plunger 104 and the cylinder 222, in a portion of the cylinder 222 between a proximal end portion of the spacer ring 228 and the endcap 112 on the dynamic end portion 108. The seal assembly 230 can be configured to operate in a high-pressure environment (e.g., at pressures over 40,000 psi and reaching up to 120,000 psi, at pressures between 20,000 and 100,000 psi, between 20,000 and 80,000 psi, and/or other pressures). The liquid pressurization assembly 100 can also include a collar 232 (e.g., a seal carrier or seal housing) inside of the endcap 112 on the dynamic end portion 108. At least a portion of the collar 232 (e.g., an annular flange portion 233) can be compressed between a second end portion 235 (e.g., a proximal end portion, as oriented in FIG. 2) of the cylinder 222 and the endcap 112. In some embodiments, the collar 232 can form a seal between the plunger 104 and the endcap 112 and can abut the seal assembly 230. For example, the collar 232 can carry one or more O-rings, gaskets, or other elastomeric, flexible, and/or resilient structures configured to form a seal between the endcap 112 and the plunger 104.

The liquid pressurization assembly 100 can include a low-pressure liquid chamber 218 configured to receive low-pressure liquid (e.g., water) from a liquid source (not shown in FIG. 2) via the inlet 115 (FIG. 1). In operation, liquid from the low-pressure liquid chamber 218 is drawn into a high-pressure liquid chamber 220 within the cylinder 222 via movement of the plunger 104 away from the inlet/outlet end portion 106. For example, as described in greater detail below, in operation the low-pressure liquid can be drawn through the check valve assembly 224 into the high-pressure liquid chamber 220 between the check valve assembly 224 and a distal end 225 of the plunger 104. Reciprocation of the plunger 104 back toward the inlet/outlet end portion 106 then compresses and/or pressurizes the liquid within the high-pressure liquid chamber 220 and drives the high-pressure liquid outwardly through the check valve assembly 224 and onward to the liquid jet cutting head assembly via the outlet 117.

Figure 3:
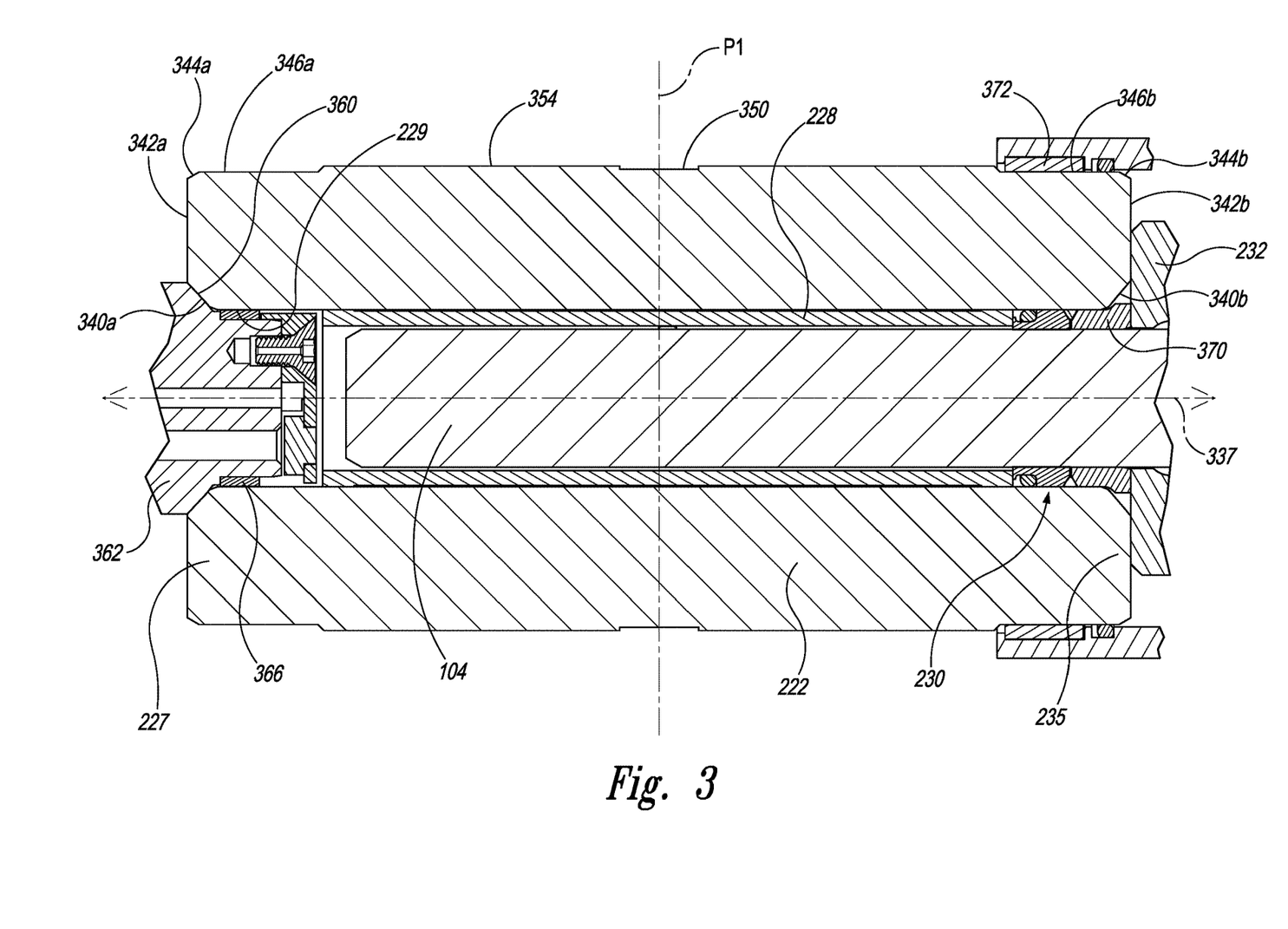
FIG. 3 is an enlarged, side cross-sectional view of a multi-function cylinder of the liquid pressurization assembly of FIG. 1, configured in accordance with embodiments of the present technology.

FIG. 3 is an enlarged cross-sectional side view of the cylinder 222, configured in accordance with embodiments of the present technology. In some embodiments (including the illustrated embodiment), the first end portion 227 of the cylinder 222 is a mirror image of the second end portion 235 with respect to a plane P1 perpendicular to a longitudinal axis 337 and bisecting the cylinder 222. That is, the two end portions 227 and 235 are dimensionally identical, or at least substantially dimensionally identical.

Each of the first and second end portions 227, 235 can include a first surface 340 identified individually as a first surface 340a and a first surface 340b, respectively, (e.g., a first loadbearing surface, first mating surface, etc.). The first surface 340 can be annular and can have a circumferentially symmetrical shape. For example, a cross-section of the first surface 340 can be identical in any plane on which the longitudinal axis 337 lies. In other embodiments, the first surface 340 is not circumferentially symmetrical. In some embodiments, the first surface 340 is tapered such that a diameter of the first surface 340 increases in a direction away from the plane P1 that bisects the cylinder 222. In some embodiments, the first surface 340 can have a constant taper (e.g., a conical or frustoconical shape), and in other embodiments all or a portion of the first surface 340 can have a nonconstant taper (e.g., a bullet shape, concave shape, and/or convex shape).

The first and second end portions 227, 235 can also include a second surface 342 identified individually as a second surface 342a and a second surface 342b, respectively (e.g., a second loadbearing surface, second mating surface, etc.). The second surfaces 342a, 342b can face directly opposite and away from each other. The second surface 342 can be annular and can have a circumferentially symmetrical shape. For example, a cross-section of the end portions 227, 235 that include the second surface 342 can be identical in any plane on which the longitudinal axis 337 lies. In other embodiments, the second surface 342 is not circumferentially symmetrical. The second surface 342 can extend radially outward from the first surface 340 with respect to the longitudinal axis 337. In some embodiments, the second surface 342 is flat and perpendicular to the longitudinal axis 337. In other embodiments, the second surface 342 includes one or more slopes, indentations, protrusions, or other non-flat (e.g., curved) features. The second surfaces 342a, 342b of the first and second end portions 227, 235 can define the ends of the cylinder 222.

In some embodiments, the first and second end portions 227, 235 include a third surface 344, identified individually as a third surface 344a and a third surface 344b, respectively (e.g., a third mating surface, a first guide surface, a chamfer, etc.). The third surface 344 can be annular and can have a circumferentially symmetrical shape. For example, a cross-section of the end portions 227, 235 that include the third surface 344 can be identical in any plane on which the longitudinal axis 337 lies. In other embodiments, the third surface 344 is not circumferentially symmetric. The third surface 344 can extend radially outward from the second surface 342 with respect to the longitudinal axis 337. In some embodiments, the third surface 344 is tapered such that a diameter of the third surface 344 increases in a direction toward the plane P1 that bisects the cylinder 222. The third surface 344 can have a constant taper (e.g., a conical or frustoconical shape). In some embodiments, the third surface 344 has a nonconstant taper (e.g., a bullet shape, concave shape, and/or convex shape).

The first and second end portions 227, 235 include a guide portion 346, identified individually as a guide portion 346a and a guide portion 346b, respectively (e.g., a reduced-diameter portion, an annular indentation, etc.) in or on a radially outward surface of the cylinder 222 proximate the respective end portions 227, 235. The guide portion 346 can be, for example, a cylindrical surface of reduced diameter relative to the adjacent outer surface 354 of the cylinder 222. In some embodiments, the guide portion 346 extends from the third surface 344 toward the plane P1 that bisects the cylinder 222, and can have a constant diameter. In other embodiments, the guide portion 346 is tapered such that a diameter of the guide portion 346 increases in a direction toward the plane P1 that bisects the cylinder 222. The guide portion 346 can have a constant taper (e.g., a conical or frustoconical shape). In some embodiments, the guide portion 346 has a nonconstant taper (e.g., a bullet shape, concave shape, and/or convex shape).

The cylinder 222 can have a maximum outer diameter of between 2 and 4 inches, between 2.5 and 3.5 inches, between 2.7 and 3.1 inches, and/or between 2.75 and 3 inches. In some embodiments, the maximum outer diameter of the cylinder 222 is 2.95 inches or approximately 2.95 inches. The guide portions 346 can have an outer diameter between 1.8 and 3.5 inches, between 2.5 and 3.2 inches, and/or between 2.8 and 3.1 inches. In some embodiments, the outer diameter of the guide portions 346 is 2.88 inches or approximately 2.88 inches. An inner diameter of the cylinder 222 can be between 0.6 and 1.6 inches, between 0.8 and 1.4 inches, between 0.95 and 1.15 inches, and/or between 1 and 1.2 inches. In some embodiments, the inner diameter of the cylinder 222 is 1.1 inches or approximately 1.1 inches. A ratio between the outer diameter of the guide portions 346 and the inner diameter of the cylinder 222 can be between 2 and 3, between 2.2 and 2.8, and/or between 2.4 and 2.6. In some embodiments, this ratio is 2.56 or approximately 2.56.

The cylinder 222 can include an indentation or channel 350 extending around all or most of the circumference of the outer surface 354 of the cylinder 222 at or near the midpoint of the cylinder 222, as measured along the longitudinal axis 337. The channel 350 can extend into cylinder 222 to a depth less than a depth of the guide portions 346. In some embodiments, the channel 350 creates an irregular surface between the first and second guide portions 346a, 346b. The channel 350 can have a width of between about 1.2 and 2.5 inches, between 1.5 and 2.2 inches, and/or between 1.9 and 2 inches. In some embodiments, the width of channel 350 is 1.95 inches.

When the cylinder 222 is orientated in a first orientation (e.g., an orientation in which the first end portion 227 is positioned near the inlet/outlet end portion 106 of the liquid pressurization assembly 100 (FIG. 1) and the plunger 104 extends through the second end portion 235 of the cylinder 222 (FIG. 2), the first surface 340a of the first end portion 227 can bear against a mating surface 360 (e.g., a complementary mating surface) of a valve body 362 of the check valve assembly 224 to form a metal-to-metal seal and react an axial and/or radial load from the valve body 362. In some embodiments (including the illustrated embodiment), the second and third surfaces 342a, 344a of the first end portion 227 do not react an external load or force when the cylinder 222 is in the first orientation. Additionally, in the illustrated embodiment, the second and third surfaces 342a, 344a of the first end portion 227 also do not contact any adjacent surfaces of the pressurization assembly 100 when the cylinder 222 is in the first orientation. The inner sidewall 229 of the cylinder 222 at the first end portion 227 can circumferentially contact a second spacer ring 366 surrounding a portion of the valve body 362. The inner sidewall 229 also defines a central bore extending from the first end portion 227 to the second end portion 235 and configured to receive the spacer ring 228, which in turn receives the plunger 104.

With continued reference to the first orientation of the cylinder 222, the second surface 342b of the second end portion 235 of the cylinder 222 can react an axial force or load (e.g., bear against a portion of) the dynamic end portion 108 of the liquid pressurization assembly 100. For example, the second surface 342b of the second end portion 235 can directly contact and bear against an opposing surface of the collar 232.

In some embodiments, the first surface 340b of the second end portion 235 contacts one or more components of the seal assembly 230. For example, the first surface 340b of the second end portion 235 can contact a backup ring 370 of the seal assembly 230. Contact between the first surface 340b of the second end portion 235 and components of the seal assembly 230 can cause minimal or negligible stress or load to the first surface 340b of the second end portion 235. The tapered shape of the first surface 340b can help to guide the seal assembly 230 into the cylinder 222 through the second end portion 235. The inner sidewall 229 of the cylinder 222 at the second end portion 235 can form a sealing surface with the seal assembly 230. In some embodiments, the guide portion 346b of the second end portion 235 contacts one or more seals, spacer rings (e.g., a third spacer ring 372), and/or other components of the liquid pressurization assembly 100.

When the cylinder 222 is in the first orientation, normal operation of the liquid pressurization system 100 can cause wear or damage to one or more of the first surface 340a of the first end portion 227, the second surface 342b of the second end portion 235, and/or the guide portion 346b of the second end portion 235 over time. However, damage and wear to other surfaces of the first and second end portions 227, 235 can be minimized or at least reduced when the cylinder 222 is in this orientation, because those surfaces are not directly contacting and/or reacting loads or stresses from adjacent structures in the liquid pressurization system 100. For example, the second surface 342a of the first end portion 227 and the first surface 340b of the second end portion 235 do not incur wear or damage (e.g., scratches, grooves, dents, etc.) when the cylinder 222 is in the first orientation because, as shown in FIG. 3, these surfaces are not in direct or forceful contact with any mating surfaces in this configuration.

In some embodiments, the cylinder 222 can be re-oriented to a second orientation that is opposite the first orientation (e.g., rotated 180 degrees about an axis perpendicular to the longitudinal axis 337). More specifically, the first end portion 227 of the cylinder 222 can be positioned at the dynamic end 108 of the liquid pressurization system 100 and the second end portion 235 can be positioned at the inlet/outlet end 106 (e.g., such that the plunger 104 extends through the first end portion 227). In the second orientation, the first surface 340b of the second end portion 235 can bear against the mating surface 360 of the valve body 362 of the check valve assembly 224 to form a metal-to-metal seal, and react an axial and/or radial load from the valve body 362. In some embodiments, the second and third surfaces 342b, 344b of the second end portion 235 do not react a load or force when the cylinder 222 is in the second orientation. The inner sidewall 229 of the cylinder 222 at the second end portion 235 can contact the second spacer ring 366.

With continued reference to the second orientation of the cylinder 222, the second surface 342a of the first end portion 227 of the cylinder 222 can react an axial force (e.g., bear against a portion of) the dynamic end 108 of the liquid pressurization assembly 100. For example, the second surface 342a of the first end portion 227 can directly contact an opposing surface of the collar 232. In some embodiments, the first surface 340a of the first end portion 227 contacts one or more components of the seal assembly 230. For example, the first surface 340a of the first end portion 227 can contact the backup ring 370 of the seal assembly 230. This relatively small contact between the first surface 340a of the first end portion 227 and components of the seal assembly 230 can cause minimal or negligible stress or load to the first surface 340a of the first end portion 227. In some embodiments, the guide portion 346a of the first end portion 227 contacts one or more seals, spacer rings (e.g., the third spacer ring 372), and/or other components of the liquid pressurization assembly 100.

Because only one of any two like surfaces (e.g. the second surfaces 342a, 342b of the first and second end portions 227, 235, respectively) reacts/bears against loads or forces (at least significant loads) when the cylinder 222 is in one orientation, the cylinder 222 can have an extended life as compared to other cylinders in which both of the two like surfaces react/bear against loads or forces in both orientations. For example, the cylinder 222 can be removed after receiving a threshold amount of wear, or after a predetermined service time, in the first orientation. The cylinder 222 can then be reinstalled in the second orientation with "fresh" surfaces now subject to loads within the system. For example, because the second surface 342a does not bear against any adjacent contact surfaces when the cylinder 222 is in the first orientation shown in FIG. 3, and thus does not incur any wear (or at least any significant wear) in this orientation, the second surface 342a will be "fresh" (e.g., without significant wear) when the cylinder 222 is flipped end-over-end and reinstalled with the second surface 342a bearing against the opposing surface of the collar 232. Additionally, due to the symmetrical nature of the first and second end portions 227, 235, installation of the cylinder 222, particularly initial installation of a new cylinder, can be performed with little or no risk of misalignment or misorientation of the cylinder 222. In some instances, inadvertent damage to the cylinder 222 during handling or installation can be obviated by installing the cylinder 222 in an orientation wherein the damaged portions are not subject to substantial forces/loads.

Some examples of the disclosed technology are further described below.

Example 1. A high-pressure cylinder for use with a liquid jet cutting system, the high-pressure cylinder comprising:
  a first end portion;
  a second end portion opposite the first end portion;
  an inner wall defining a central bore configured to receive a plunger and extending from the first end portion to the second end portion;
  the first end portion having—
    a first tapered surface extending from the inner wall, the first tapered surface configured to form a seal with a mating surface of a check valve when the high-pressure cylinder is in a first orientation; and
    a first annular surface facing away from the second end portion, the first annular surface configured to bear against a mating surface of a pump when the high-pressure cylinder is in a second orientation rotated 180 degrees end-over-end from the first orientation; and
  the second end portion having—
    a second annular tapered surface extending from the inner wall, the second tapered surface configured to form a seal with the mating surface of the check valve when the high-pressure cylinder is in the second orientation; and
    a second annular surface facing away from the first end portion, the second annular surface configured to bear against the mating surface of the pump when the high-pressure cylinder is in the first orientation.

Example 2. The high-pressure cylinder of example 1 wherein a diameter of the first tapered surface increases in a first direction away from the second end portion, and a diameter of the second tapered surface increases in a second direction away from the first end portion.

Example 3. The high-pressure cylinder of example 1 wherein the seal between the first tapered surface and the mating surface of the check valve is load-bearing.

Example 4. The high-pressure cylinder of example 1 wherein the seal between the second tapered surface and the mating surface of the check valve is a load-bearing metal-to-metal seal.

Example 5. The high-pressure cylinder of example 1 wherein the first tapered surface is a first conical surface, and the second tapered surface is a second conical surface.

Example 6. The high-pressure cylinder of example 1 wherein the first end portion is a mirror-image of the second end portion with respect to a plane that bisects the high-pressure cylinder lengthwise.

Example 7. The high-pressure cylinder of example 1 wherein—
  the first end portion further comprises a first chamfer on a first radially-outward edge of the first end portion; and
  the second end portion further comprises a second chamfer on a second radially-outward edge of the second end portion.

Example 8. The high-pressure cylinder of example 1 wherein—
  a first portion of the inner wall proximate the first end portion forms a sealing surface with an annular seal when the plunger operably extends through the first end portion of the high-pressure cylinder; and
  a second portion of the inner wall proximate the second end portion forms a sealing surface with the annular seal when the plunger operably extends through the second end portion of the high-pressure cylinder.

Example 9. The high-pressure cylinder of example 1, wherein the plunger operably extends through the second end portion of the high-pressure cylinder when the high-pressure cylinder is in the first orientation, and wherein the plunger operably extends through the first end portion of the high-pressure cylinder when the high-pressure cylinder is in the second orientation.

Example 10. The high-pressure cylinder of example 1 wherein the first annular surface is configured to bear against a collar of a liquid jet cutting system when the high-pressure cylinder is in the second orientation.

Example 11. A high-pressure cylinder for use with a liquid jet cutting system, the high-pressure cylinder comprising:
  a first end portion;
  a longitudinal axis;
  a second end portion opposite the first end portion along the longitudinal axis;
  wherein—
    each of the first end portion and the second end portion have—
      a first load bearing surface configured to contact a surface of a check valve of the liquid jet cutting system; and
      a second load bearing surface positioned radially outward from the first load bearing surface, the second load bearing surface configured to contact a surface of a dynamic end portion of the liquid jet cutting system;
    when the high-pressure cylinder is installed in the liquid jet cutting system in a first orientation— the first load bearing surface of the first end portion forms a metal-to-metal seal with the surface of the check valve, and the second load bearing surface of the second end portion reacts an axial load from the contact surface of the dynamic end portion of the liquid jet cutting system; and when the high-pressure cylinder is installed in the liquid jet cutting system in a second orientation— the first load bearing surface of the second end portion forms a metal-to-metal seal with the surface of the check valve, and the second load bearing surface of the first end portion reacts an axial load from the contact surface of the dynamic end portion of the liquid jet cutting system.

Example 12. The high-pressure cylinder of example 11 wherein— when the high-pressure cylinder is installed in the liquid jet cutting system in the first orientation— the second load bearing surface of the first end portion does not react an axial load; and the first load bearing surface of the second end portion does not form a metal-to-metal seal with any components of the liquid jet cutting system; and when the high-pressure cylinder is installed in the liquid jet cutting system in the second orientation— the second load bearing surface of the second end portion does not react an axial load; and the first load bearing surface of the first end portion does not form a metal-to-metal seal with any components of the liquid jet cutting system.

Example 13. The high-pressure cylinder of example 11 wherein the first end portion is a mirror image of the second end portion.

Example 14. The high-pressure cylinder of example 11 wherein each of the first end portion and the second end portion have a guide surface disposed radially-outward from the second load-bearing surface, the guide surface of the second end portion configured to engage with a guide ring at the dynamic end portion of the liquid jet cutting system.

Example 15. The high-pressure cylinder of example 14 wherein— when the high-pressure cylinder is installed in the liquid jet cutting system in the first orientation— the guide surface of the second end portion engages the guide ring; and when the high-pressure cylinder is installed in the liquid jet cutting system in the second orientation— the guide surface of the first end portion engages the guide ring.

Example 16. The high-pressure cylinder of example 11, further comprising a central inner bore extending along the longitudinal axis, wherein the central inner bore has a constant inner diameter along an entire length of the high-pressure cylinder between the first load bearing surface of the first end portion and the first load bearing surface of the second end portion.

Example 17. The high-pressure cylinder of example 11 wherein the second load bearing surfaces of the first end portion and the second end portion are planar and perpendicular to the longitudinal axis.

Example 18. The high-pressure cylinder of example 11 wherein the first load bearing surfaces of the first end portion and the second end portion are frustoconical.

Example 19. The high-pressure cylinder of example 11 wherein a minimum inner diameter of the high-pressure cylinder is between 1 inch and 1.2 inches, and wherein a maximum outer diameter of the high-pressure cylinder is between 2.75 inches and 3 inches.

Example 20. A method of servicing a seal interface of a high-pressure cylinder in a liquid jet cutting system, the method comprising:

removing the high-pressure cylinder from the liquid jet cutting system when the high-pressure cylinder is in a first orientation; and reinstalling the high-pressure cylinder in the liquid jet cutting system in a second orientation, opposite to the first orientation;

wherein— when the high-pressure cylinder is installed in the liquid jet cutting system in the first orientation— a first end portion of the high-pressure cylinder forms a seal with a check valve of the liquid jet cutting system, and a second end portion of the high-pressure cylinder reacts an axial load from a dynamic end portion of the liquid jet cutting system; and when the high-pressure cylinder is installed in the liquid jet cutting system in the second orientation— the second end portion of the high-pressure cylinder forms a seal with the check valve; and the first end portion reacts the axial load from the dynamic end portion of the liquid jet cutting system.

Example 21. The method of example 20 wherein— when the high-pressure cylinder is installed in the liquid jet cutting system in the first orientation— the second end portion of the high-pressure cylinder does not form a metal-to-metal seal with any component of the liquid jet cutting system, and the first end portion of the high-pressure cylinder does not react an axial load from any component of the liquid jet cutting system; and when the high-pressure cylinder is installed in the liquid jet cutting system in the second orientation— the first end portion of the high-pressure cylinder does not form a metal-to-metal seal with any component of the liquid jet cutting system, and the second end portion of the high-pressure cylinder does not react an axial load from any component of the liquid jet cutting system.

Example 22. The method of example 20 wherein the first end portion and the second end portion are mirror images of each other.

Example 23. The method of example 20 wherein a first surface of the first end portion forms a seal with the check valve when the cylinder is in the first orientation, and wherein a second surface of the first end portion reacts the axial load from the dynamic end portion of the liquid jet cutting system when the cylinder is in the second orientation.

Example 24. The method of example 23 wherein a first surface of the second end portion forms a seal with the check valve when the cylinder is in the second orientation, and wherein a second surface of the second end portion reacts the axial load from the dynamic end portion of the liquid jet cutting system when the cylinder is in the first orientation.

Example 25. The method of example 20, wherein—
when the high-pressure cylinder is installed in the liquid jet cutting system in the first orientation—
a first annular tapered surface of the first end portion forms a seal with a mating surface of the check valve, and
a first annular surface of the second end portion facing away from the first end portion bears against a mating surface of the dynamic end; and
when the high-pressure cylinder is installed in the liquid jet cutting system in the second orientation—
a second annular tapered surface of the second end portion forms a seal with a mating surface of the check valve, and
a second annular surface of the first end portion facing away from the first end portion bears against a mating surface of the dynamic end References throughout the foregoing description to features, advantages, or similar language do not imply that all of the features and advantages that may be realized with the present technology should be or are in any single embodiment of the technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

The above Detailed Description of examples and embodiments of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes are presented in a given order, alternative implementations may perform routines having steps in a different order, and some processes may be deleted, moved, added, subdivided, combined, and/or modified to provide alternative or sub-combinations. The teachings of the present disclosure provided herein can be applied to other systems, not necessarily the system described above. The elements and acts of the various embodiments described above can be combined to provide further embodiments. All of the patents and applications and other references identified herein, including any that may be listed in accompanying filing papers, are incorporated herein by reference. Aspects of the present disclosure can be modified, if necessary, to employ the systems, functions, and concepts of the various references described above to provide yet further embodiments of the present disclosure.

In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

From the foregoing, it will be appreciated that specific embodiments of the technology have been described herein for purposes of illustration, but that various modifications may be made without deviating from the spirit and scope of the various embodiments of the technology. Further, while various advantages associated with certain embodiments of the technology have been described above in the context of those embodiments, other embodiments may also exhibit such advantages, and not all embodiments need necessarily exhibit such advantages to fall within the scope of the technology. Accordingly, the technology is not limited, except as by the appended claims. Moreover, although certain aspects of the technology are presented below in certain claim forms, the applicant contemplates the various aspects of the technology in any number of claim forms. Accordingly, the applicant reserves the right to pursue additional claims after filing this application to pursue such additional claim forms, in either this application or in a continuing application.

I claim:

1. A high-pressure cylinder for use with a liquid jet cutting system, the high-pressure cylinder comprising:
a first end portion;
a second end portion opposite the first end portion;
an inner wall defining a central bore configured to receive a plunger and extending from the first end portion to the second end portion;
the first end portion having—
a first tapered surface extending from the inner wall, the first tapered surface configured to form a seal with a mating surface of a check valve when the high-pressure cylinder is in a first orientation; and
a first annular surface facing away from the second end portion, the first annular surface configured to bear against a mating surface of a liquid pressurization assembly when the high-pressure cylinder is in a second orientation rotated 180 degrees end-over-end from the first orientation; and
the second end portion having—
a second tapered surface extending from the inner wall, the second tapered surface configured to form a seal with the mating surface of the check valve when the high-pressure cylinder is in the second orientation; and
a second annular surface facing away from the first end portion, the second annular surface configured to bear against the mating surface of the liquid pressurization assembly when the high-pressure cylinder is in the first orientation.

2. The high-pressure cylinder of claim 1 wherein a diameter of the first tapered surface increases in a first direction away from the second end portion, and a diameter of the second tapered surface increases in a second direction away from the first end portion.

3. The high-pressure cylinder of claim 1 wherein the seal between the first tapered surface and the mating surface of the check valve is load-bearing.

4. The high-pressure cylinder of claim 1 wherein the seal between the second tapered surface and the mating surface of the check valve is a load-bearing metal-to-metal seal.

5. The high-pressure cylinder of claim 1 wherein the first tapered surface is a first conical surface, and the second tapered surface is a second conical surface.

6. The high-pressure cylinder of claim 1 wherein the first end portion is a mirror-image of the second end portion with respect to a plane that bisects the high-pressure cylinder lengthwise.

7. The high-pressure cylinder of claim 1 wherein—
the first end portion further comprises a first chamfer on a first radially-outward edge of the first end portion; and the second end portion further comprises a second chamfer on a second radially-outward edge of the second end portion.

8. The high-pressure cylinder of claim 1 wherein—
a first portion of the inner wall proximate the first end portion forms a sealing surface with an annular seal when the plunger operably extends through the first end portion of the high-pressure cylinder; and
a second portion of the inner wall proximate the second end portion forms a sealing surface with the annular seal when the plunger operably extends through the second end portion of the high-pressure cylinder.

9. The high-pressure cylinder of claim 1, wherein the plunger operably extends through the second end portion of the high-pressure cylinder when the high-pressure cylinder is in the first orientation, and wherein the plunger operably extends through the first end portion of the high-pressure cylinder when the high-pressure cylinder is in the second orientation.

10. The high-pressure cylinder of claim 1 wherein the first annular surface is configured to bear against a collar of a liquid jet cutting system when the high-pressure cylinder is in the second orientation.

11. A high-pressure cylinder for use with a liquid jet cutting system, the high-pressure cylinder comprising:
a first end portion;
a longitudinal axis;
a second end portion opposite the first end portion along the longitudinal axis;
wherein—
each of the first end portion and the second end portion have—
a first load bearing surface configured to contact a surface of a check valve of the liquid jet cutting system; and
a second load bearing surface positioned radially outward from the first load bearing surface, the second load bearing surface configured to contact a surface of a dynamic end portion of the liquid jet cutting system;
when the high-pressure cylinder is installed in the liquid jet cutting system in a first orientation—
the first load bearing surface of the first end portion forms a metal-to-metal seal with the surface of the check valve, and
the second load bearing surface of the second end portion reacts an axial load from the contact surface of the dynamic end portion of the liquid jet cutting system; and
when the high-pressure cylinder is installed in the liquid jet cutting system in a second orientation—
the first load bearing surface of the second end portion forms a metal-to-metal seal with the surface of the check valve, and
the second load bearing surface of the first end portion reacts an axial load from the contact surface of the dynamic end portion of the liquid jet cutting system.

12. The high-pressure cylinder of claim 11 wherein—
when the high-pressure cylinder is installed in the liquid jet cutting system in the first orientation—
the second load bearing surface of the first end portion does not react an axial load; and
the first load bearing surface of the second end portion does not form a metal-to-metal seal with any components of the liquid jet cutting system; and
when the high-pressure cylinder is installed in the liquid jet cutting system in the second orientation—
the second load bearing surface of the second end portion does not react an axial load; and
the first load bearing surface of the first end portion does not form a metal-to-metal seal with any components of the liquid jet cutting system.

13. The high-pressure cylinder of claim 11 wherein the first end portion is a mirror image of the second end portion.

14. The high-pressure cylinder of claim 11 wherein each of the first end portion and the second end portion have a guide surface disposed radially-outward from the second load bearing surface, the guide surface of the second end portion configured to engage with a guide ring at the dynamic end portion of the liquid jet cutting system.

15. The high-pressure cylinder of claim 14 wherein—
when the high-pressure cylinder is installed in the liquid jet cutting system in the first orientation—
the guide surface of the second end portion engages the guide ring; and
when the high-pressure cylinder is installed in the liquid jet cutting system in the second orientation—
the guide surface of the first end portion engages the guide ring.

16. The high-pressure cylinder of claim 11, further comprising a central inner bore extending along the longitudinal axis, wherein the central inner bore has a constant inner diameter along an entire length of the high-pressure cylinder between the first load bearing surface of the first end portion and the first load bearing surface of the second end portion.

17. The high-pressure cylinder of claim 11 wherein the second load bearing surfaces of the first end portion and the second end portion are planar and perpendicular to the longitudinal axis.

18. The high-pressure cylinder of claim 11 wherein the first load bearing surfaces of the first end portion and the second end portion are frustoconical.

19. The high-pressure cylinder of claim 11 wherein a minimum inner diameter of the high-pressure cylinder is between 1 inch and 1.2 inches, and wherein a maximum outer diameter of the high-pressure cylinder is between 2.75 inches and 3 inches.

20. A method of servicing a seal interface of a high-pressure cylinder in a liquid jet cutting system, the method comprising:
removing the high-pressure cylinder from the liquid jet cutting system when the high-pressure cylinder is in a first orientation; and
reinstalling the high-pressure cylinder in the liquid jet cutting system in a second orientation, opposite to the first orientation;
wherein—
when the high-pressure cylinder is installed in the liquid jet cutting system in the first orientation—
a first end portion of the high-pressure cylinder forms a seal with a check valve of the liquid jet cutting system,
and
a second end portion of the high-pressure cylinder reacts an axial load from a dynamic end portion of the liquid jet cutting system; and
when the high-pressure cylinder is installed in the liquid jet cutting system in the second orientation—
the second end portion of the high-pressure cylinder forms a seal with the check valve; and the first end portion reacts the axial load from the dynamic end portion of the liquid jet cutting system.

21. The method of claim 20 wherein—
when the high-pressure cylinder is installed in the liquid jet cutting system in the first orientation—
the second end portion of the high-pressure cylinder does not form a metal-to-metal seal with any component of the liquid jet cutting system, and
the first end portion of the high-pressure cylinder does not react an axial load from any component of the liquid jet cutting system; and
when the high-pressure cylinder is installed in the liquid jet cutting system in the second orientation—
the first end portion of the high-pressure cylinder does not form a metal-to-metal seal with any component of the liquid jet cutting system, and
the second end portion of the high-pressure cylinder does not react an axial load from any component of the liquid jet cutting system.

22. The method of claim 20 wherein the first end portion and the second end portion are mirror images of each other.

23. The method of claim 20 wherein a first surface of the first end portion forms a seal with the check valve when the high-pressure cylinder is in the first orientation, and wherein a second surface of the first end portion reacts the axial load from the dynamic end portion of the liquid jet cutting system when the high-pressure cylinder is in the second orientation.

24. The method of claim 23 wherein a first surface of the second end portion forms a seal with the check valve when the high-pressure cylinder is in the second orientation, and wherein a second surface of the second end portion reacts the axial load from the dynamic end portion of the liquid jet cutting system when the high-pressure cylinder is in the first orientation.

25. The method of claim 20, wherein—
when the high-pressure cylinder is installed in the liquid jet cutting system in the first orientation—
a first annular tapered surface of the first end portion forms a seal with a mating surface of the check valve, and
a first annular surface of the second end portion facing away from the first end portion bears against a mating surface of the dynamic end portion; and
when the high-pressure cylinder is installed in the liquid jet cutting system in the second orientation—
a second annular tapered surface of the second end portion forms a seal with a mating surface of the check valve, and
a second annular surface of the first end portion facing away from the first end portion bears against a mating surface of the dynamic end portion.

* * * * *